Feb. 12, 1935.  H. R. C. ANTHONY ET AL  1,991,131
DRY BATTERY CONSTRUCTION
Filed Jan. 24, 1931  4 Sheets-Sheet 1
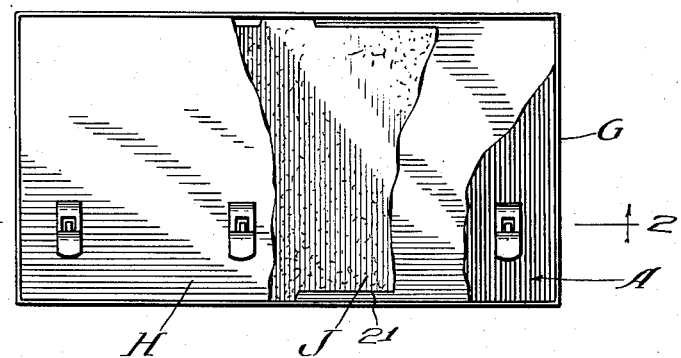
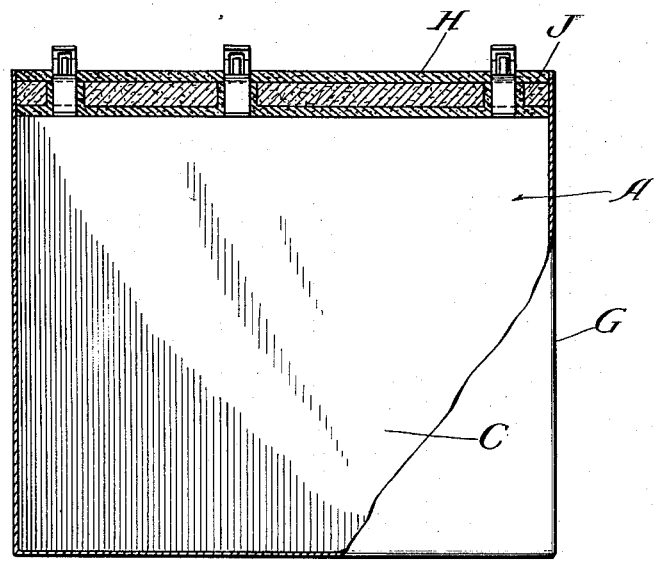
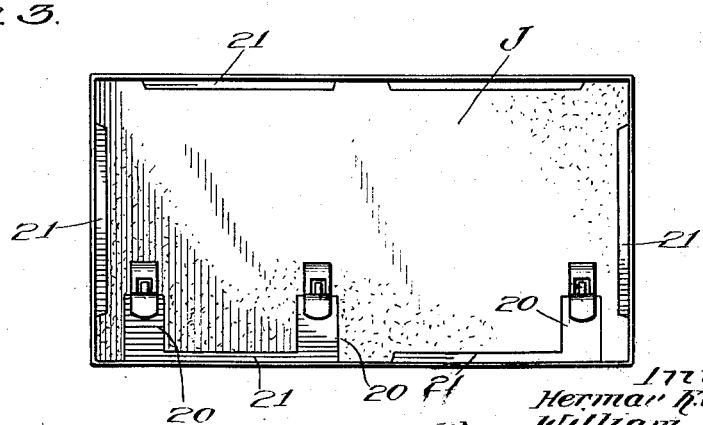

Feb. 12, 1935. H. R. C. ANTHONY ET AL 1,991,131
DRY BATTERY CONSTRUCTION
Filed Jan. 24, 1931 4 Sheets-Sheet 2
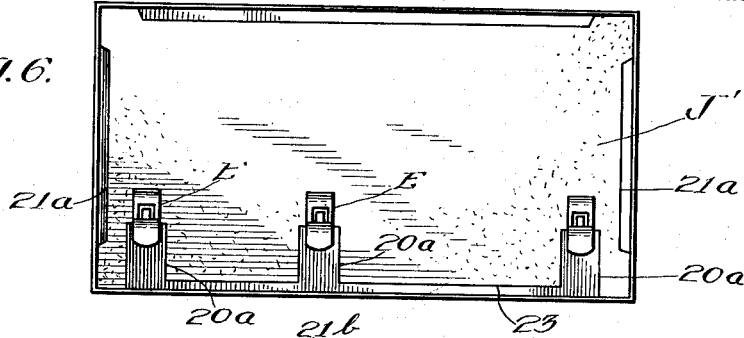
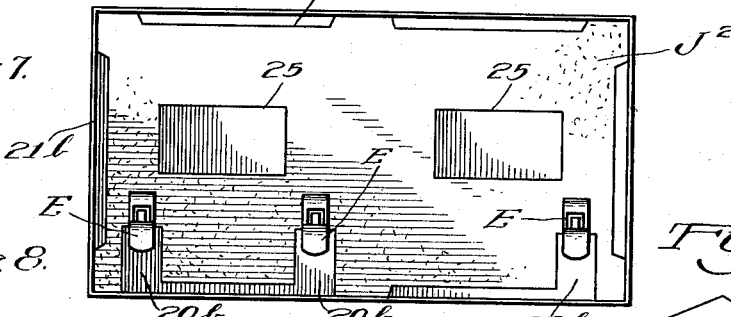
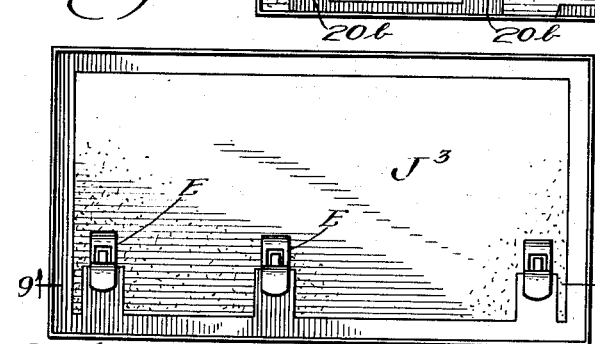
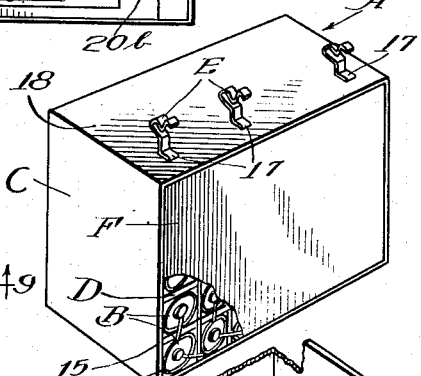
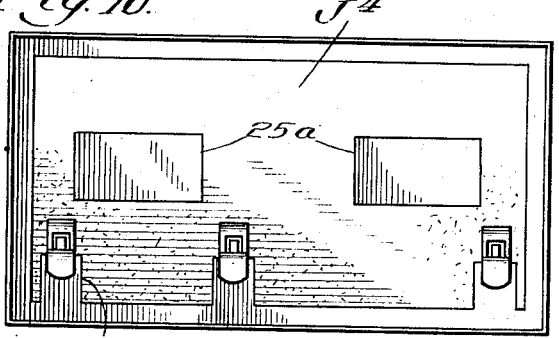
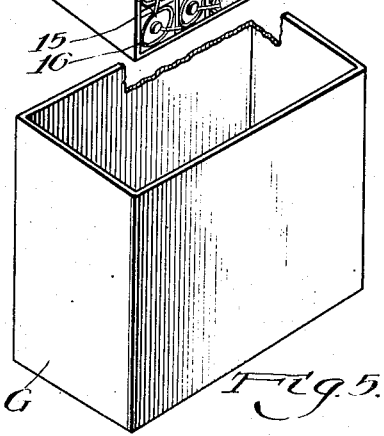
Inventors:
Herman R. C. Anthony
William H. Roper

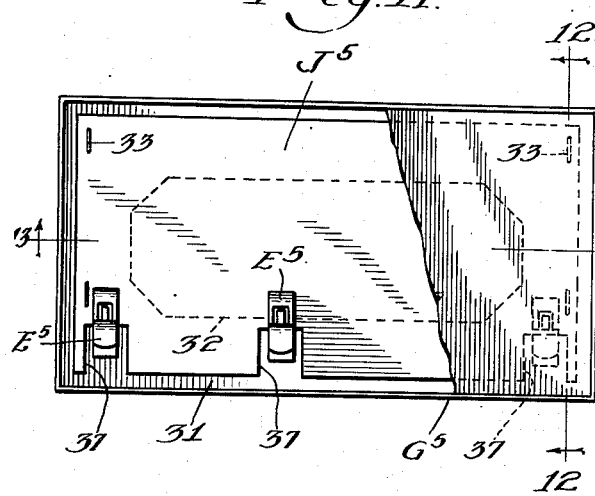
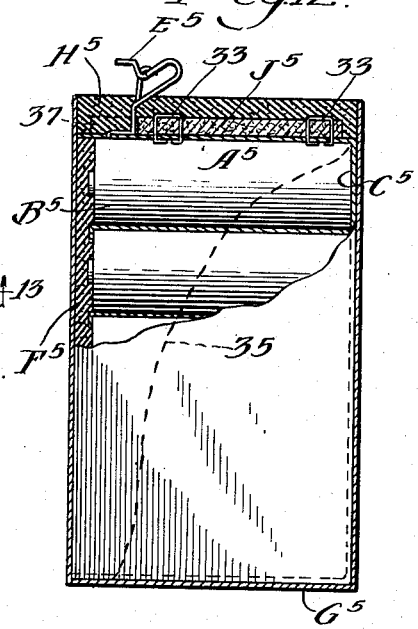
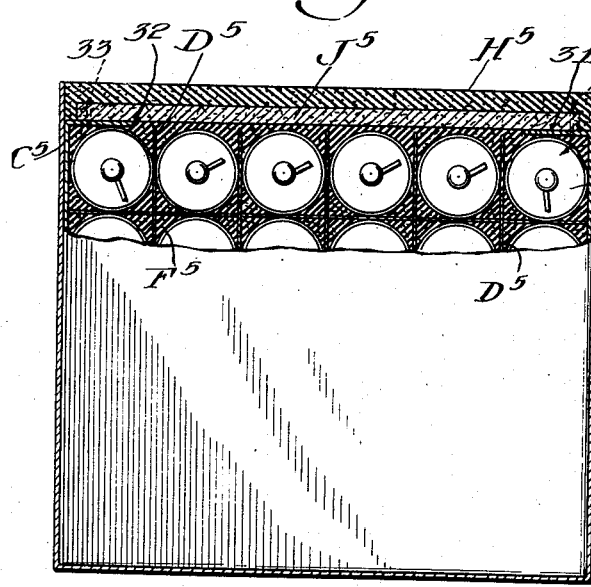
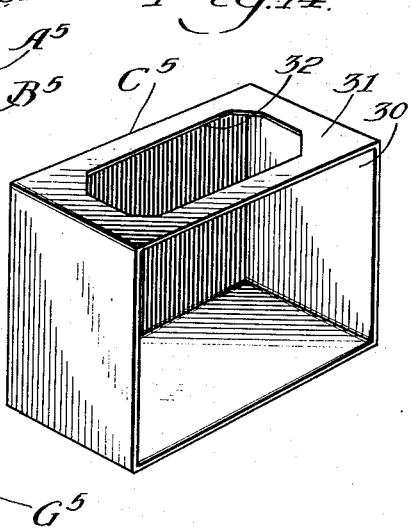

Feb. 12, 1935.  H. R. C. ANTHONY ET AL  1,991,131
DRY BATTERY CONSTRUCTION
Filed Jan. 24, 1931   4 Sheets-Sheet 4
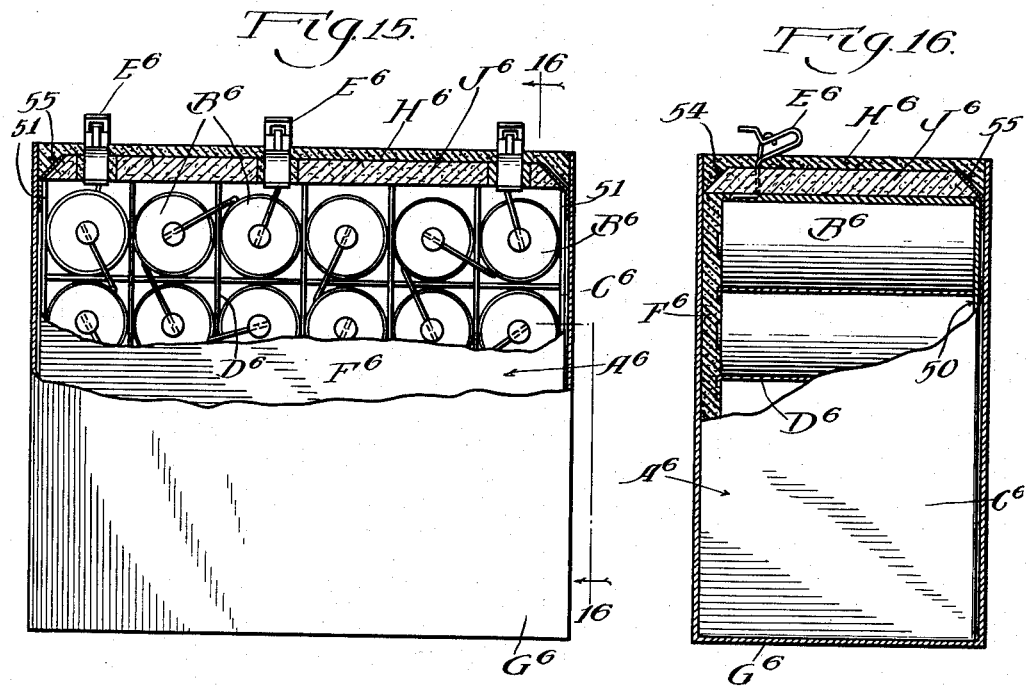
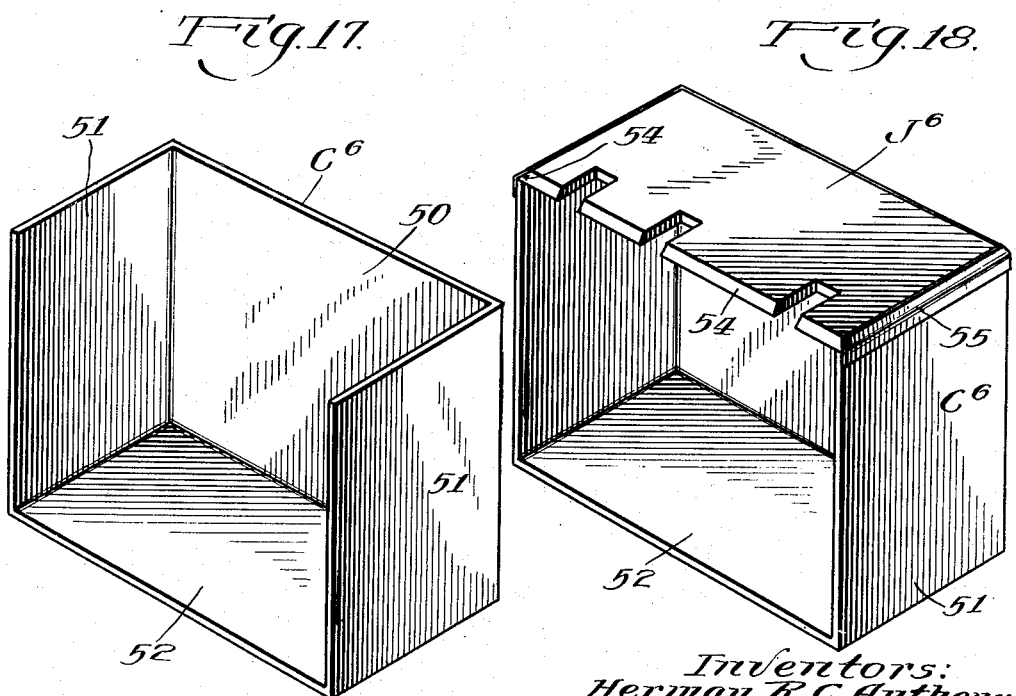
Inventors:
Herman R. C. Anthony
William A. Roper
By Dyrenforth, Lee, Chritton & Wiles
Attys.

Patented Feb. 12, 1935

1,991,131

UNITED STATES PATENT OFFICE 1,991,131

DRY BATTERY CONSTRUCTION

Herman R. C. Anthony and William A. Roper, Madison, Wis., assignors to French Battery Company, Madison, Wis., a corporation of Wisconsin Application January 24, 1931, Serial No. 511,016

1 Claim. (Cl. 136—108)

The invention relates to the construction of dry batteries, and is particularly adapted for embodiment in dry batteries which comprise a plurality of dry cells connected to give a potential that is higher than that which can be obtained from a single cell.

One form of the invention comprises a nest of dry cells arranged in a casing which has one side closed by a layer of plastic material, such as sealing wax, the plastic material being poured over and between the cells while it is in a molten condition and being then permitted to harden or set. The casing with its dry cells fits snugly in an outer box or receptacle which is also sealed by a layer of plastic material, preferably sealing wax, in which layer a re-enforcing sheet, plate or member is embedded to prevent cracking, etc., of the layer. The re-enforcing member is made of wall-board, or cardboard, in this embodiment of the invention and is notched or apertured so that terminals projecting from the inner casing may extend through the sealing layer provided for the outer box or receptacle.

Another form of the invention comprises a nest of dry cells arranged in a casing formed from cardboard. One wall of the casing is provided with a relatively large aperture and a re-enforcing member of wall-board is stitched to the outer side of the apertured wall. Plastic material, such as sealing wax, or asphalt is poured over the dry cells in such manner that it adheres to the inner surface of the re-enforcing member. The casing with its dry cells is inserted in an outer box or receptacle which is sealed by a layer of plastic material, preferably sealing wax. This layer of plastic material adheres to the re-enforcing member and to the marginal portions of the outer surface of the apertured wall.

Other objects and advantages of the invention will become apparent as the following description progresses, reference being had to the accompanying drawings, wherein:

Figure 1 is a plan view, partly broken away, of a dry-battery which embodies the invention.

Fig. 2 is a section taken on line 2—2 of Fig. 1.

Fig. 3 is a plan view of the improved battery as it appears before the final layer of sealing wax, or the equivalent for the purpose, is poured into the outer box or receptacle.

Fig. 4 is a perspective view of the inner casing, the casing being broken away to show the dry cell therein.

Fig. 5 is a perspective view of the outer box or receptacle.

Fig. 6 is a plan view of a dry battery which is in the same state of manufacture as that illustrated in Fig. 3, the battery shown in Fig. 6 being one embodying a form of the invention which is different from that embodied in the battery illustrated in Figs. 1 to 3, inclusive.

Fig. 7 is a plan view of a battery which embodies another form of the invention, the battery shown in Fig. 7 being in the same state of manufacture as the battery shown in Fig. 6.

Fig. 8 is a battery embodying still another form of the invention, the battery being shown in the same state of manufacture as the battery shown in Fig. 7.

Fig. 9 is a section taken on line 9—9 of Fig. 8.

Fig. 10 is a plan view of a battery embodying another form of the invention, the battery being in the same state of manufacture as the battery shown in Fig. 8.

Fig. 11 is a plan view of a battery which embodies still another form of the invention, the battery being shown in the same state of manufacture as the battery shown in Fig. 8.

Fig. 12 is a section taken on line 12—12 of Fig. 11, but showing the battery as it appears when completed.

Fig. 13 is a section, partly in elevation, taken on line 13—13 of Fig. 11.

Fig. 14 is a perspective view of the inner casing for holding the dry cells.

Fig. 15 is a side elevation, partly in section, of a battery which embodies another form of the invention.

Fig. 16 is a section taken on line 16—16 of Fig. 15.

Fig. 17 is a perspective view of an inner casing forming part of the battery shown in Fig. 15, and Fig. 18 is a perspective view of the same inner casing with a re-enforcing member secured thereto.

Referring for the present to Figs. 1 to 5, inclusive, wherein one form of the invention is illustrated, A designates a nest or unit of dry cells B (see Fig. 4); C is a casing for holding the dry cells; D is an egg-crate cardboard structure introduced into the casing C and forming compartments for the dry cells B; E designates terminals which project through a wall of the casing C and are operatively connected to the dry cells B; F is a wall or layer of plastic material which serves as a closure member for the casing C and seals it; G is an outer box or receptacle in which the nest A of dry cells fits snugly (see Fig. 5); H is a layer of plastic material closing the box or receptacle G (see Fig. 2); and J is a re-enforcing member embedded in the layer H.

As set forth above, the dry cells B are held in compartments formed in the egg-crate cardboard structure D which is more fully shown and described in a co-pending application, Serial No. 458,430, (now Patent No. 1,932,128, granted Oct. 24, 1930) filed May 31, 1930. The dry cells B are operatively connected to each other by suitable conductors 15 and three of the dry cells are operatively connected to the terminals E.

The casing C may be made of any suitable material, but is preferably formed from cardboard, and is preferably provided with an open side 16 through which the egg-crate structure D and the dry cells B may be introduced into the casing. The terminals E project through slots 17 formed in a top wall 18 of the casing C. The wall or seal F is preferably formed from sealing wax, or the equivalent for the purpose, and is preferably poured over and between the dry cells while it is in a molten state. When the sealing wax solidifies, the dry cells are protected from the moisture in the air, and are held rigidly in place within the casing C.

As best shown in Fig. 2, the nest A of dry cells fits snugly in the outer box or receptacle G, the casing C being adapted to slip into the box or receptacle G in such manner that the terminals E project a short distance above the box G. In this instance, the casing C is introduced into the box G through the top thereof and the opening in the top of the box G is then closed by the seal or layer of plastic material.

The box or receptacle G may be made of any suitable material, such as sheet metal, plastic materials, or the like, but is preferably formed from cardboard. The seal or layer H may be made from any suitable material, but sealing wax is preferably employed for this purpose.

After the nest A of dry cells has been placed in the box G, the sealing wax, or its equivalent, is poured into the open top end of the box G over the top surface of the casing C to form a relatively thin layer thereof into which the re-enforcing member J is pressed so that the sealing wax, or the equivalent, will adhere to the re-enforcing member. The box G is then filled flush with its top end with sealing wax, or the equivalent, it being understood that the sealing wax, or the equivalent, is poured into the box G in heated and substantially fluid state. The plastic material solidifies when it cools and forms a top wall for the box G so that the nest A of dry cells is sealed within the outer box or receptacle G.

The re-enforcing member J is preferably formed from wall board which, in turn, is preferably formed from fibrous material.

The re-enforcing member J re-enforces the seal or layer H and prevents cracking, etc. thereof. Referring to Fig. 3, it will be noted that the re-enforcing member J is substantially rectangular in form and is provided with notches 20 in one edge to accommodate the terminals E. Shallower notches 21 are also provided in all of the edges of re-enforcing member J so that the plastic material beneath the re-enforcing member may join or bind with the plastic material above the re-enforcing member. This forms a substantially integral seal or layer H.

In Fig. 6, a re-enforcing member J' is shown, which re-enforcing member J' embodies another form of the invention and is preferably formed from wall-board. The re-enforcing member J' is provided with notches 20a to accommodate the terminals E. It is also provided with shallow notches 21a in its end edges, which notches 21a are substantially of the same dimensions as the notches 21 described above. Relatively long shallow notches 23 are provided in the side edges of the re-enforcing member J'.

Still another form of the invention is illustrated in Fig. 7. A re-enforcing member J² made of wall-board is provided with notches 20b for accommodating the terminals E. The re-enforcing member J² is also provided with notches 21b which are similar to the notches 21 described above and have the same function. In addition to the notches 20b and 21b, the re-enforcing member J² is provided with relatively large apertures 25 which extend therethrough and permit the plastic material of the layer H to extend through the re-enforcing member.

Referring now to Figs. 8 and 9, wherein another form of the invention is embodied in a re-enforcing member which is formed of cardboard, preferably chip-board, it will be noted that the re-enforcing member, which is designated by the reference character J³ in this instance, is relatively thin as compared with the thickness of the wallboard employed in making the re-enforcing members J, J' and J². The re-enforcing member J³ is employed in connection with the nest A of dry cells and the outer box or receptacle G and a layer H' of plastic material, preferably sealing wax, is employed in the same manner as the layer H described above, the re-enforcing member J³ being embedded in the layer H'.

It will be noted that the re-enforcing member J³ is preferably rectangular in shape and that its length and width are preferably less than the length and width, respectively, of the outer box or receptacle G so that the plastic material forming the layer H' may completely enclose the re-enforcing member. Notches 20d are provided in the re-enforcing member J³ for accommodating the terminals E.

The layer H' is formed in the same manner as the layer H. First a relatively small quantity of sealing wax, or the equivalent, is poured in a heated and relatively fluid state on the top surface of the nest A after which the re-enforcing member J³ is pressed against the heated plastic material covering the nest. Then an additional quantity of plastic material is poured over the re-enforcing member J³ and the heated plastic material joins or combines with the plastic material first poured into the top of the box G.

In Fig. 10 another form of the invention is shown embodied in a re-enforcing member J⁴ which is preferably formed of the same substance as the re-enforcing member J³. The re-enforcing member J⁴ preferably has the same outlines as the re-enforcing member J³, but is provided with relatively large apertures 25a extending therethrough so that the plastic material of the seal may extend through the re-enforcing member.

Referring now to Figs. 11 to 14, inclusive, wherein another form of the invention is illustrated, A⁵ designates a casing for holding the dry cells; D⁵ is an egg-crate cardboard structure introduced into the casing C⁵ and forming compartments for the dry cells B⁵. E⁵ designates terminals which project through a wall of the casing C⁵ and are operatively connected to the dry cells B⁵; F⁶ is a layer of plastic material which closes one entire side of the casing C⁵ and extends between the cells C⁵ to hold them rigidly in place. $G^5$ is an outer box or receptacle in which the nest $A^5$ of dry cells fits snugly; $H^5$ is a layer of plastic material closing the box or receptacle $G^5$, and $J^5$ is a member for re-enforcing the plastic material $H^5$.

The casing $C^5$ is preferably formed from cardboard and is open at one side as indicated at 30 (see Fig. 14). The casing $C^5$ is provided with a top wall 31 having a relatively large aperture 32. The re-nforcing member $J^5$ abuts against the outer surface of the wall 31 and covers the aperture 32, the re-enforcing member being secured to the wall 31 by wire staples, or stitches, 33.

As set forth above, the dry cells $B^5$ are disposed in the compartments formed by the egg-crate structure $D^5$, the dry cells being held against movement by the plastic material $F^5$ which is preferably asphalt or paving filler. The asphalt or paving filler, in a molten state, is poured over the dry cells after they have been assembled in the casing $C^5$ and connected to each other and to the terminals $E^5$ by suitable conductors. The plastic material flows down between the cells, but more of the plastic material is poured into that end of the casing $C^5$ which is adjacent the wall 31 so that it will adhere to the inner surface of the wall 31 and to that portion of the inner surface of the re-enforcing member $J^5$ exposed through the aperture 32. The dotted line 35 in Fig. 12 indicates in general the distance the plastic material flows down into the spaces between the cells. It will be noted that the plastic material $F^5$ binds all of the cells into a block-like structure of which the re-enforcing member $J^5$ is a part.

After the layer $F^5$ has solidified, the nest $A^5$ is placed within the outer box $G^5$, as illustrated in Figs. 11 to 13, inclusive. The layer $H^5$ of plastic material, preferably sealing wax, is poured into the open end of the box in a molten state. When the layer $H^5$ solidifies it adheres to the marginal portions of the outer surface of the wall 31 and also to the outer surfaces of the re-enforcing member $J^5$. The re-enforcing member $J^5$ is preferably wall-board formed from fibrous material; the re-enforcing member is preferably rectangular in form and is provided with notches 37 so that the terminals $E^5$ may project therethrough.

Another form of the invention is illustrated in Figs. 15 to 18, inclusive, wherein $A^6$ designates a nest or unit of dry cells $B^6$ held in an inner casing $C^6$, the dry cells $B^6$ being disposed in the compartments of an egg-crate cardboard structure $D^6$; $E^6$ designates terminals operatively connected to the dry cells $B^6$; $F^6$ is a layer of plastic material which closes one side of the inner casing $C^6$; $G^6$ is an outer box or receptacle in which the nest $A^6$ of dry cells fits snugly; $H^6$ is a layer of plastic material which seals the outer box or receptacle $G^6$, and $J^6$ is a re-enforcing member disposed in the layer $H^6$.

The casing $C^6$ is preferably formed from cardboard and, as best shown in Fig. 17, preferably comprises a side wall 50, end walls 51 and a bottom wall 52, the top and one side of the casing being left open. The re-enforcing member $J^6$ preferably serves as a closure member for the top of the casing $C^6$ and is preferably formed from wall-board. The re-enforcing member is preferably provided with beveled edges 54 and adhesive tape 55 is preferably applied to these beveled edges and to the outer surfaces of the end walls 51 and the side wall 50 to secure the re-enforcing member to the inner casing $C^6$ (see Fig. 18).

When the battery is constructed, the egg crate structure $D^6$ is inserted in the inner casing $C^6$ after the re-enforcing member $J^6$ has been attached to the inner casing. The dry cells $B^6$ are then inserted in the compartments of the egg crate structure and plastic material, preferably asphalt, is poured over the tops of the dry cells to form the layer $F^6$. Some of the asphalt flows down between the dry cells and serves to hold them in fixed positions relative to each other. Of course, the dry cells are connected to each other and to the terminals $E^6$ by suitable conductors before the layer $F^6$ is formed.

After the layer $F^6$ has hardened, the nest $A^6$ is inserted in the outer box $G^6$ and the layer $H^6$ is formed. The layer $H^6$ is formed from a suitable plastic compound, preferably sealing wax, which is poured over the re-enforcing member $J^6$ in a molten condition.

Referring to Figs. 15 and 16, it will be noted that the sealing wax $H^6$ flows down around the edges of the re-enforcing member $J^6$ and re-enforces the joint between the inner casing $C^6$ and the re-enforcing member.

While we have shown and described certain embodiments of our invention, it is to be understood that it is capable of many modifications. Changes, therefore, in the construction and arrangement may be made without departing from the spirit and scope of the invention as disclosed in the appended claim, in which it is our intention to claim all novelty inherent in our invention as broadly as possible, in view of the prior art.

What we claim as new, and desire to secure by Letters Patent, is:

A dry battery comprising: a casing; a plurality of dry cells disposed in said casing and operatively connected to each other; terminals projecting from said casing and operatively connected to said dry cells; a box in which said casing is disposed; a substantially integral seal for said box comprising a layer of plastic material adhering to said casing and forming a wall of the box and a reinforcing member of substantially the same size as the opening in the box disposed in said plastic layer, spaced from the inner and outer surfaces thereof and having portions engaging all the inner sides of said box, said reinforcing member being provided with peripheral notches and a plurality of centrally located apertures, only some of said notches being positioned to house said terminals, said notches and apertures permitting plastic material to extend therethrough.

HERMAN R. C. ANTHONY.
WILLIAM A. ROPER.